United States Patent [19]
Blanc

[11] Patent Number: 5,776,527
[45] Date of Patent: Jul. 7, 1998

[54] PACKAGE OF GROUND COFFEE OF THE PREFILLED TABLET TYPE AND ESPRESSO COFFEE MACHINE USING SUCH A PACKAGE

[75] Inventor: Jean Pierre Blanc, Gattieres, France

[73] Assignee: Compagnie Mediterraneene des Cafes S.A., Carros, France

[21] Appl. No.: 602,724

[22] PCT Filed: Sep. 5, 1994

[86] PCT No.: PCT/FR94/01039

§ 371 Date: Feb. 21, 1996

§ 102(e) Date: Feb. 21, 1996

[87] PCT Pub. No.: WO95/07041

PCT Pub. Date: Mar. 16, 1995

[30] Foreign Application Priority Data

Sep. 6, 1993 [FR] France ................... 93 10760
Jun. 16, 1994 [FR] France ................... 94 07509

[51] Int. Cl.[6] ..................... B65B 1/00; A47J 31/00
[52] U.S. Cl. ................. 426/77; 429/81; 429/82; 429/594; 99/289; 99/295; 99/297; 99/323; 206/0.5
[58] Field of Search ............... 426/594, 77, 81, 426/82; 99/289, 295, 297, 323; 206/0.5

[56] References Cited

U.S. PATENT DOCUMENTS

| | | | |
|---|---|---|---|
| 2,004,486 | 6/1935 | Cooper | 426/77 |
| 2,952,202 | 9/1960 | Renner . | |
| 3,446,624 | 5/1969 | Luedtke | 426/77 |
| 3,692,536 | 9/1972 | Fant | 426/77 |
| 4,801,464 | 1/1989 | Hubbard, Jr. | 426/77 |

FOREIGN PATENT DOCUMENTS

| | | |
|---|---|---|
| 41931 | 12/1981 | European Pat. Off. . |
| 093366 | 9/1983 | European Pat. Off. . |
| 1216342 | 4/1960 | France . |
| 1575181 | 7/1969 | France . |
| 2211924 | 7/1974 | France . |
| 1579383 | 1/1970 | Germany . |
| 495138 | 10/1970 | Switzerland . |
| 527592 | 10/1972 | Switzerland . |

*Primary Examiner*—Anthony J. Weier
*Attorney, Agent, or Firm*—Young & Thompson

[57] ABSTRACT

Packaging of ground coffee in the form of pastille, "dosette" or predosed bag (1) usable in espresso coffee machines, the pastille, the "dosette" or the predosed bag (1) being formed of filter-paper (3) which encloses the ground coffee (4). The ground coffee content (4) placed in the pastille or the like is partially or totally circumscribed at its periphery, by at least one piece (6) of a sufficiently rigid material acting as a frame, so that the pastille or the like (1) has a good mechanical behaviour. Application to the production of coffees.

10 Claims, 3 Drawing Sheets

PACKAGE OF GROUND COFFEE OF THE PREFILLED TABLET TYPE AND ESPRESSO COFFEE MACHINE USING SUCH A PACKAGE

FIELD OF THE INVENTION

The present invention relates to a package of ground coffee, in the form of a tablet, a small quantity or prefilled bag. The package can be used in espresso coffee machines adapted to receive such a package of specific shape.

Thus the tablet, the small quantity or the prefilled bag is formed of filter paper containing the ground coffee and having a sealing edge.

BACKGROUND OF THE INVENTION

The state of the art includes many references.

Among the most interesting, document EP-A-0 361 569 relates to a coffee filter in which a predetermined quantity of ground coffee is retained between upper and lower filter papers fixed to a support.

This latter is either a filter adapted to receive a certain quantity of paper, or a cartridge for a filter, and comprises a vertical edge. The assembly is characterized by the fact that the upper filter paper forms with the filter or the cartridge a small basin, which is to say that the peripheral edge of the upper filter paper is bent obliquely upwardly.

The document EP-A-0 422 898 describes an improved and optimized shape of a filter bag for infusion coffee, adapted to be used in coffeemakers and to produce a homogeneous infusion of coffee in different coffeemakers of the American or European type. The bag comprises a first piece of filter paper, whose surface is stretched by at least 3% from a rounded pocket, and sealed to a second circular piece of filter paper to form a sealing edge of about 1.27 cm thereabout. A measured quantity of ground coffee is enclosed in the rounded pocket and provided with a space at its upper portion of at least 50% by volume of the pocket. The first and second circular pieces of filter paper each have preferably a diameter of about 12.7 cm and are filled with a measured quantity of ground coffee to infuse five cups of water. In this improved shape, the presence of an edge of 1.27 cm, in combination with an increased surface due to the stretching of the filter, produces a coffee with increased extraction of the soluble solids and a decrease of the deviation from standard extraction.

The document WO-92 07775 concerns a sealed cartridge containing a measured quantity of substance adapted for the preparation of a beverage, by dissolution or extraction with a liquid, which is disposed in a collecting member for a liquid constituted by a truncated cup. The assembly thus formed is placed in a recess of a "spoon" of an espresso coffee machine. The top of the cartridge is perforated by a perforating and injecting member which injects a liquid under pressure into the cartridge. The lower membrane of the cartridge deforms under the force of the pressure thus created and is pressed against the perforating points at the bottom of the cup. The beverage flows into the recess and can thus be collected in cups. The invention permits optimizing the duration of contact of the substance contained in the cartridge with the liquid provided for its dissolution or its extraction.

FR-A-2,575,181: Disposable infusion apparatus comprising upper and lower filters forming a chamber between them, a measured quantity of ground coffee disposed in the chamber, an annular disc to be supported by the edge of a coffee cup, a wall extending from the disc and suspending the filters and the coffee at a certain distance under the disc in an infusion position and can be folded in a position in which the filters and the mass of coffee are in the annular space of the disc for packaging, the wall and the upper disc defining a water reservoir in the infusion position.

There is another problem there since the above is only applicable to coffee infusion and not to espresso coffee (percolating extraction). The coffee is not very compacted. The disc functions as engagement member at the edge of the cup, it comprises an engagement border for that purpose. The disc is articulated and may be folded towards the interior of the annular space. It may not be used in a machine.

CH-495 138: This patent describes a small quantity of coffee without any armature or rigid piece. There is no mechanical device which would allow one to use this type of small quantity of coffee to make espresso coffee.

The drawbacks of these different coffee filter devices derives from their structure. Either they are constituted of a rigid body requiring piercing, the cost of such a device being very great. Or else the structure is limited to the use of a paper filter which is less costly but whose mechanical strength is quite insufficient.

Certain manufacturers have attempted to improve the mechanical resistance of the devices using a package based on a paper filter. To do this, they have compacted the coffee within the packaging, to such an extent that the coffee is practically solid. With this, the percolation or lixiviation can be achieved only with a very high pressure with the sealing problems that this gives rise to.

SUMMARY OF THE INVENTION

To this end, the present invention provides a ground coffee package in the form of a tablet, a small quantity or a prefilled bag, in the form of a paper filter which encloses the ground coffee, the contents of ground coffee disposed in the tablet or the like constituting a central part, are partially or totally circumscribed at the region of its periphery by at least one member, characterized by the fact that the member is of a sufficiently rigid material, which serves as a framework, such that said tablet or the like has sufficient mechanical resistance to be usable in espresso coffeemakers, and that the rigid member, which serves as a framework, is disposed in the transverse plane of the central part which forms the disc containing the ground coffee or product to be infused.

The periphery of the tablet or the like is constituted by filter paper which forms a sealing edge present about some or all of the periphery of said tablet or the like.

The coffee tablet or the like is formed of a central portion containing the ground coffee and a peripheral portion or sealing edge whose shapes are respectively those of a disc and of a ring.

The rigid member serving as framework is formed by two rings placed on opposite sides of the filter paper forming the sealing edge.

According to one embodiment, the rings are of cardboard.

The invention also relates to an espresso coffeemaker comprised conventionally of a water heater and a cylinder and piston assembly, itself comprised by a cylindrical body enclosing a piston using coffee tablets or the like, which is characterized by the fact that it is constituted of abutments disposed at one end of the water heater in a position perpendicular to the longitudinal axis of the espresso coffeemaker, the cylinder and piston assembly coacting with said water heater at said abutments to secure in position a coffee tablet or the like which is fixed by its member of rigid material, between the abutments on the one hand, and the water heater on the other hand.

The cylinder and piston assembly is constituted by a cylindrical body enclosing a piston.

Each abutment is movable along an axis parallel to the longitudinal axis of the espresso coffeemaker.

The upper portion of said espresso coffeemaker comprises a slot situated vertically above the abutments, such that the positioning of the rigid member of each tablet or the like between the abutments on the one hand, and the water heater on the other hand, is achieved simply by gravity.

An opening is provided vertically below the abutments such that when said abutments are moved to be parallel to each other, the tablet or the like is not retained by its rigid member and falls outside the espresso coffeemaker simply by gravity.

BRIEF DESCRIPTION OF THE DRAWINGS

The accompanying drawings are given by way of example and are not limiting. They show a preferred embodiment of the invention. They permit easy understanding of the invention.

They permit easy understanding of the invention.

Finally.

DETAILED DESCRIPTION OF THE INVENTION

The present invention provides ground coffee 4 in the form of a tablet, a small quantity or a prefilled bag 1 which is usable by certain machines such as espresso coffee machines 2.

The package can of course without departing from the present invention, contain ground coffee 4 or any other substance which can be infused or placed in contact with water, for example tea, chicory, etc.

Figure 1:
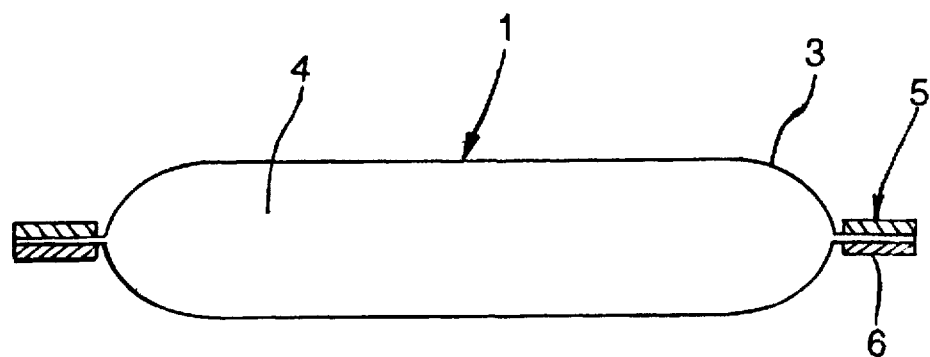
FIG. 1 shows a package according to the present invention in transverse cross section.

The tablet, the small quantity or the prefilled bag 1 is constituted by filter paper 3 which encloses the ground coffee 4 or any other substance such as that shown in FIG. 1, the tablet or the like 1 forming a sealing edge 5 about its periphery which is characterized in that it is formed partially or totally by filter paper 3 and by at least one piece 6 constituted of a material sufficiently rigid to impart good mechanical strength to said tablet 1 or the like.

Figure 2:
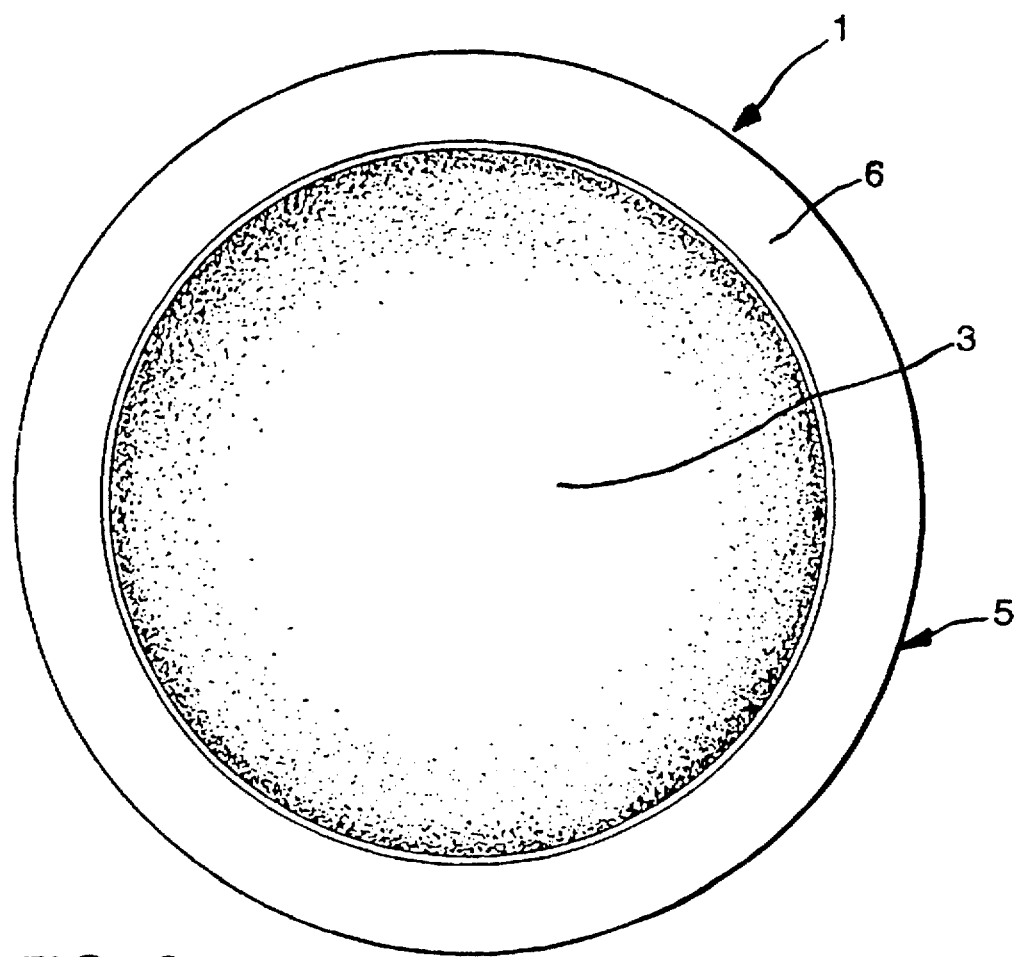
FIG. 2 is an elevational view of the package.

As will be seen in FIG. 2, the coffee tablet 1 is formed by a central portion constituted by the ground coffee 4 and the filter paper 3 which traps it and a peripheral portion or a sealing edge 5 whose shapes are respectively those of a disc for the central part and a ring for the peripheral part.

Of course any other shape having the same functions and leading to the same result can only be considered technical equivalents.

According to a preferred embodiment, the rigid member 6 is formed by two rings placed on opposite sides of the filter paper 3 forming the sealing edge 5.

Similarly, the rings are made of cardboard.

According to a preferred embodiment, the rigid piece 6, which functions as armature, is disposed in the transversal plane of the central part which forms the disc containing the ground coffee or product to be infused.

This ring or rigid reinforcement piece 6 is level and flat.

This material is sufficiently rigid and biodegradable to permit good operation of the espresso coffeemaker and good degradation once the package has been used.

Figure 3:
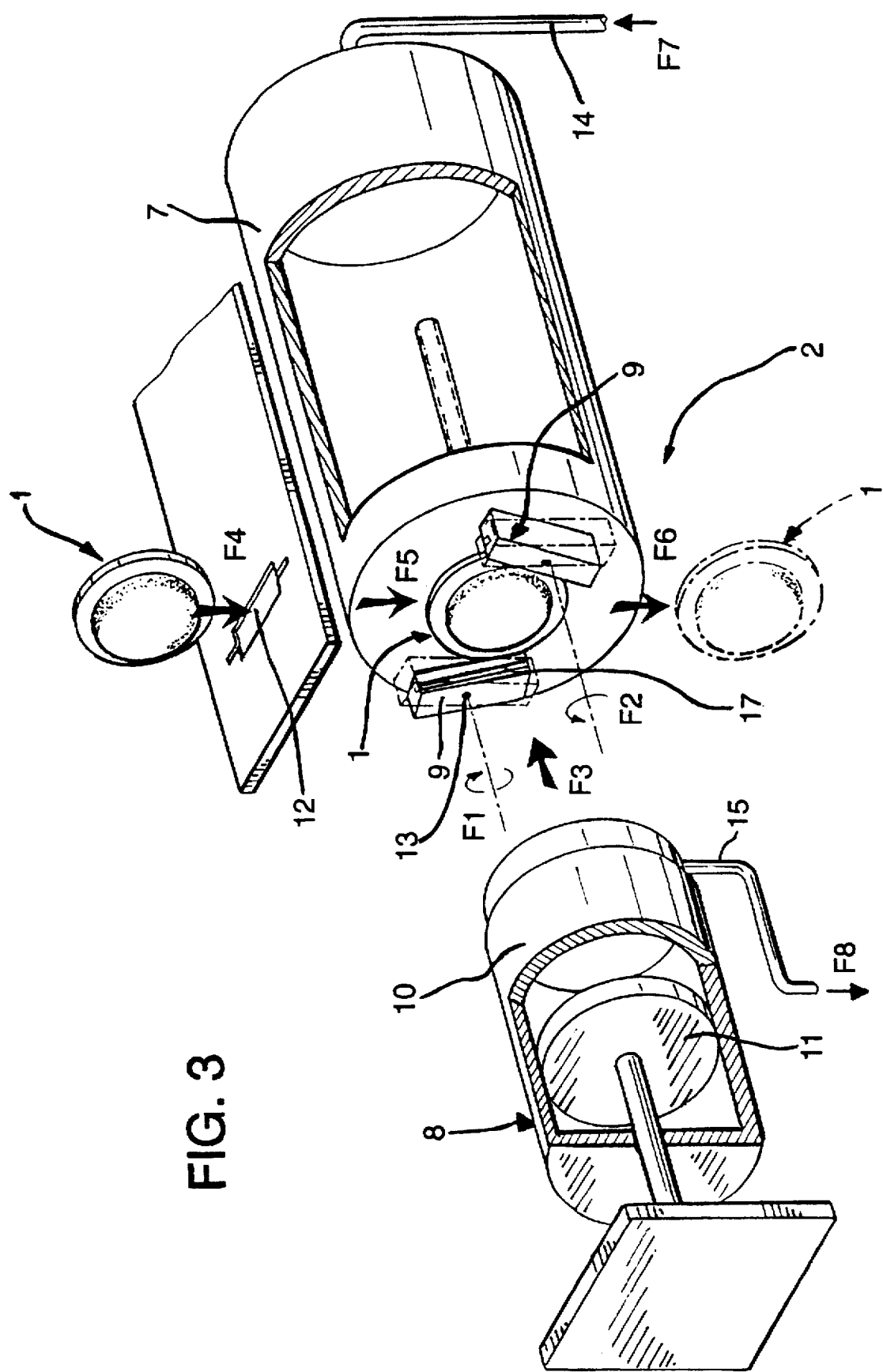
FIG. 3 shows a perspective view of an embodiment of an espresso coffeemaker which uses the package shown in the preceding figures.

The espresso coffeemaker 2 is shown in FIG. 3.

This latter is essentially constituted by a water heater 7, a cylinder and piston assembly 8 and abutments 9 disposed at one end of the water heater 7, the cylinder and piston assembly 8 coacting with said water heater 7 at said abutments 9 so as to fix in place a coffee tablet 1.

The cylinder and piston assembly 8 is of conventional form, which is to say it is constituted by a cylindrical body 10 enclosing a piston 11.

The overall operation of this espresso coffeemaker 2 will be better explained as follows.

The introduction of the tablet 1 takes place in a vertical plane and the action of the piston 11 in a horizontal plane.

According to the espresso coffeemaker 2 shown in FIG. 3, the upper portion of said machine 2 comprises a slot 12 located above the abutments 9 permitting the positioning of each tablet 1 according to the arrows F4 and F5 within the espresso coffeemaker 2, by simple gravity.

Once the tablet 1 is maintained wedged at the abutments 9 between the heater 7 on the one hand and the cylindrical body 10 on the other hand, the tablet 1 is located pressed against the heater 7 and the cylindrical body 10 of said cylinder and piston assembly 8, because of the movement of the cylindrical body 10 in the direction of arrow F3. This operation is well illustrated in FIGS. 4 to 6.

Of course, the water heater 7 is first or at the same time supplied with water according to the arrow F7 from an inlet tubing 14.

Figure 5:
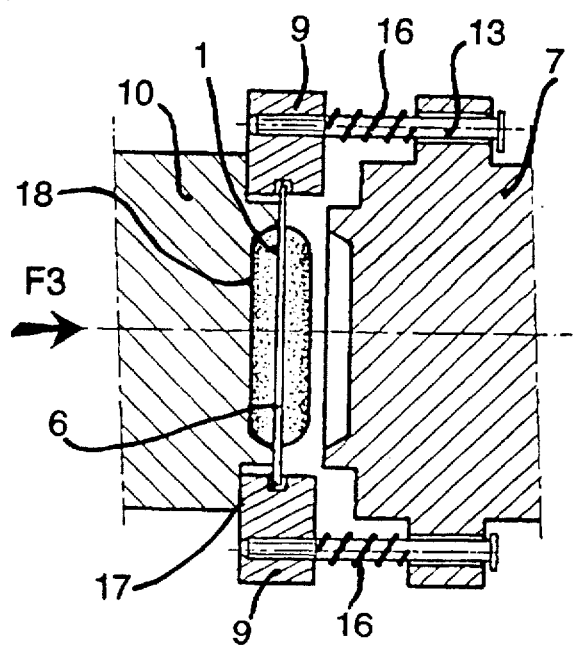
FIG. 5 shows a cross sectional view identical to that of FIG. 4 during the approach of said cylindrical body and said heater.
Figure 6:
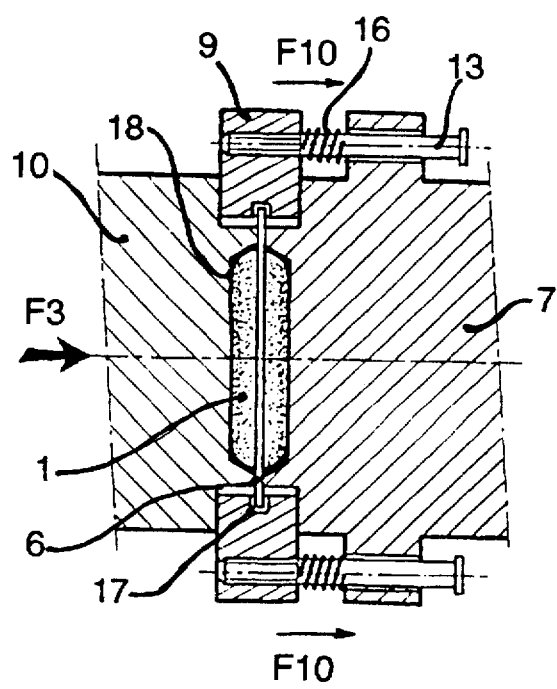
FIG. 6 shows a cross sectional view identical to those of FIGS. 4 and 5 at the end of the approach to each other of the body and the heater, which forms the infusion chamber.

The cylindrical body 10 will then move toward the tablet 1 in the direction of the arrow 3, such that the abutments 9 and the rigid member 6 will be in contact with said body 10, as seen in FIG. 5. This approach continues then as indicated in FIG. 6, which permits the translation of the abutments 9, in the direction of arrow F10, along their axles 13, against the action of springs 16. The emplacement of said abutments 9 is delimited by recesses on the body 10 and the heater 7. The body 10 and heater 7 are in abutment for each other except for the rigid member 6 of the tablet 1 that is between them, which then serves as a sealing joint between them.

The body 10 comprises a half recess situated opposing a half recess of the heater 7. When said body 10 and said heater 7 come together, the two semi-recesses form an infusion chamber 18, which is sealed by the rigid member 6.

Figure 4:
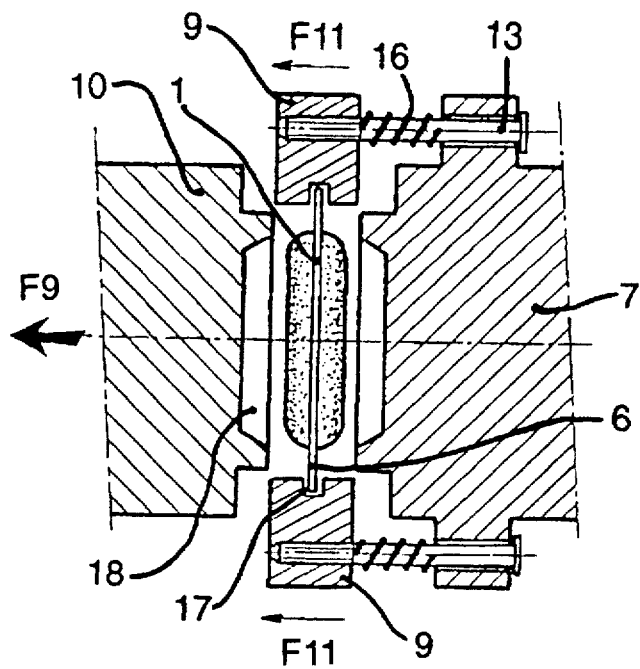
FIG. 4 shows a horizontal longitudinal cross section of the espresso coffee machine, in the region of the infusion chamber before the cylindrical body and the heater are brought together.

When percolation of the water through the coffee is terminated, the reverse movement is effected, which is to say that the cylindrical body 10 separates from the heater 7 in the direction of the arrow F9 of FIG. 4.

Because of this, the springs 16 permit the return of the tablet 1 by means of abutments 9 to its initial position. This movement of the abutments 9 takes place in the direction of arrow F11.

The water in the heater 7 is either already heated before passing through said heater 7, or heated directly within the heater 7. The forced passage of the water through the tablet 1 permits obtaining judiciously aromatic coffee. The coffee can then be delivered in the direction of arrow F8 from an outlet valve 15.

The movements of the cylindrical body 10 relative to the piston 11 are effected by the introduction of a fluid such as water within the cylindrical body 10 of the cylinder and piston assembly 8.

To simplify understanding of the figures, these movements as well as the means for effecting them are not shown. They are already known in the art.

Each abutment 9 is movable along an axle 16 parallel to the horizontal axis of the espresso coffee machine, such that the abutments 9 can pivot in a vertical plane according to the arrows F1 and F2 so as to form an angle more or less closed, permitting retaining the tablet 1. This pivoting takes place about the axle 13 of each abutment, which permits the tablet 1 either to be maintained at the level of the infusion chamber 18 before infusion chamber 18 is closed, which is the case when the longitudinal axes of the two abutments 9 form between them an angle whose opening is directed upwardly, or to fall to the outside by gravity in the direction of the arrow F6, from the espresso coffee machine 2, when the longitudinal axes of the abutments 9 are parallel.

This discharge is effected thanks to an opening provided below the abutments 9, but not shown in the figures.

The movement of the abutments 9 in the direction of arrows F1 and F2 is automated as a function of the position of the cylindrical body 10.

This automation takes place by means of an assembly of mechanical members, such as cams and rods not shown in the drawings, but whose use is already well known in the art.

REFERENCES

1. Tablet, small quantity or prefilled bag of coffee
2. Espresso coffeemaker
3. Filter paper
4. Ground coffee
5. Sealing border
6. Rigid reinforcement member serving as the armature of the sealing joint
7. Water heater
8. Cylinder and piston assembly
9. Abutments
10. Cylindrical of the cylinder and piston assembly 8
11. Piston of the cylinder and piston assembly 8
12. Upper slot of the espresso coffeemaker 2
13. Axle of rotation of translation for each abutment 9
14. Water inlet tubing
15. Coffee outlet tubing
16. Spring for each axle 13
17. Groove in each abutment 9
18. Infusion chamber
F1 and F2. Rotative movement of the abutments 9 relative to the water heater 7
F3 and F9. Translatory movement of the movement 10 of the cylinder and piston assembly 8
F4, F5 and F6. Movement of the tablet 1 or the like by gravity
F7 and F8. Direction of displacement of the water and of the coffee solution
F9. Direction of displacement opposite F3 of the cylinder and piston assembly 8 or spacing of the body 10 from the heater 7
F10. Displacement of the abutments 9 against the springs 16 due to displacement F3
F11. Freeing of the abutments 9 under the urging of their springs 16 due to the displacement F9

I claim:

1. Package of ground coffee, comprising:

a prefilled bag having a central axis and including a first concave filter portion having a first peripheral edge which extends circumferentially relative to said central axis and a first flange extending from said first peripheral edge radially outward relative to said central axis, and a second concave filter portion having a second peripheral edge which extends circumferentially relative to said central axis and a second flange extending from said second peripheral edge radially outward relative to said central axis, an inner surface of said first concave portion facing an opposing inner surface of said second concave portion to provide a cavity therebetween structured and configured for the containment of coffee, said first flange abutting said second flange in a plane which extends in a transverse direction relative to said central axis and which bisects said cavity into two substantially equal parts, and an annular reinforcement member which abuts at least one of said first flange and said second flange, said annular reinforcement member being sufficiently rigid to serve as a framework such that said prefilled bag has sufficient mechanical strength to be usable in an espresso coffee maker.

2. Package according to claim 1, wherein the first concave portion and the second concave portions are made of filter paper.

3. Package according to claim 1, wherein the first and second flanges are made of filter paper and together form in the transverse plane a sealing edge about at least a peripheral portion of the prefilled bag.

4. Package according to claim 3, wherein the cavity containing the coffee is formed of filter paper, and the sealing edge has the shape of a ring.

5. Package according to claim 2, wherein the annular reinforcement member serving as a framework is formed by two rings placed on opposite sides of the filter paper forming a sealing edge about at least a peripheral portion of the prefilled bag.

6. Package according to claim 5, wherein the rings are made of cardboard.

7. Package according to claim 4, wherein the reinforcement member is level and flat.

8. Espresso coffee machine for use with a package of ground coffee, said espresso machine extending in a longitudinal direction and comprising:

a water heater having inlet means for water;

an assembly operatively associated with said water heater and including an outlet for coffee, and a cylinder enclosing a piston adapted to move in said longitudinal direction;

means for introducing a package of ground coffee in a vertical plane transverse to the longitudinal direction and between the water heater and the assembly;

said water heater having abutments disposed at one end thereof in a position perpendicular to said longitudinal direction, said abutments including means for receiving a rigid edge of the coffee package, said assembly including means for coacting with said water heater at said abutments to secure in position the coffee package by its rigid edge between the abutments.

9. Espresso coffee machine according to claim 8, wherein each abutment is movable along an axis parallel to the longitudinal direction.

10. Espresso coffee machine according to claim 8, wherein the means for introducing a package of ground coffee comprises a slot situated on the upper portion of said espresso coffee machine, vertically above the abutment such that positioning of the rigid edge of the coffee package between the abutments takes place by gravity, said espresso coffee machine further comprising an opening provided vertically below the abutments such that when the abutments are moved so as to be parallel to each other, the coffee package is no longer retained by its rigid edge, and falls outside the espresso coffee machine by gravity.

* * * * *